US006406783B1

(12) United States Patent
Phillips et al.

(10) Patent No.: US 6,406,783 B1
(45) Date of Patent: Jun. 18, 2002

(54) BULK ABSORBER AND PROCESS FOR MANUFACTURING SAME

(75) Inventors: Walter A. Phillips, Tempe, AZ (US); Ed Ruskowski, Carlsbad, CA (US); Rick Kuehn, Apache Junction, AZ (US)

(73) Assignee: McDonnell Douglas Helicopter, Co., Mesa, AZ (US)

( * ) Notice: Subject to any disclaimer, the term of this patent is extended or adjusted under 35 U.S.C. 154(b) by 43 days.

(21) Appl. No.: 09/692,557

(22) Filed: Oct. 19, 2000

Related U.S. Application Data

(63) Continuation of application No. 09/116,056, filed on Jul. 15, 1998, now abandoned.

(51) Int. Cl.[7] .................................................. B32B 5/22

(52) U.S. Cl. ................................ 428/317.9; 428/313.5; 428/313.7; 428/313.9; 523/218

(58) Field of Search ........................... 428/313.5, 313.7, 428/313.9, 317.9; 523/218

(56) References Cited

U.S. PATENT DOCUMENTS 3,672,986 A 6/1972 Schneble, Jr. et al.
3,940,262 A 2/1976 Neibylski et al. ........... 75/20 F
4,049,844 A 9/1977 Bolon et al.
4,111,713 A 9/1978 Beck ....................... 106/288 B
4,169,915 A 10/1979 Heitmann et al. .......... 428/310
4,270,985 A 6/1981 Lipson et al.
4,447,471 A 5/1984 Putt et al.
4,529,477 A 7/1985 Lundberg et al.
4,568,603 A 2/1986 Oldham
4,595,623 A 6/1986 Du Pont et al.
4,774,121 A 9/1988 Vollenweider, II
4,775,439 A 10/1988 Seeger, Jr. et al.
4,788,230 A 11/1988 Mudge
4,843,105 A 6/1989 Reischl et al. ................ 521/54
4,896,164 A 1/1990 Burke et al.
4,919,994 A 4/1990 Incremona et al.
4,924,228 A 5/1990 Novak et al.
4,933,208 A 6/1990 Dorinski
4,956,393 A 9/1990 Boyd et al.
5,002,824 A 3/1991 Warren ....................... 428/290

(List continued on next page.)

*Primary Examiner*—Blaine Copenheaver
*Assistant Examiner*—Hai Vo
(74) *Attorney, Agent, or Firm*—Stout, Uxa, Buyan & Mullins, LLP; Donald E. Stout

(57) ABSTRACT

A bulk absorber has a continuous concentration gradient of particles with dielectric or magnetic altered properties. The bulk absorber may be made from foam or, ceramic. The particles may be carbon fibers, carbon black, carbon whiskers, coated hollow microspheres, or a combination thereof. A manufacturing system for fabricating a bulk absorber has two delivery devices, a controller, an intermingling device, a positioning device, and a forming device. The delivery devices produce flows of absorber precursors, with at least one of the flows having a concentration of particles having dielectric or magnetic altering properties. The ratio of the flows is controlled by the controller. The intermingling device receives and mixes the flows to produce a combined flow. The particle concentration in the combined flow is controlled by the controller. The positioning device directs the depositing of the combined flow into a cavity to build a non-solidified item. The forming device solidifies the non-solidified item into a bulk absorber. The bulk absorber is also manufactured by the process of producing the flows of absorber precursors, with at least one of the flows having a concentration of particles with dielectric or magnetic altering properties. The flow are intermingled and the flow ratios are varied to produce a combined flow with a desired concentration of particles with dielectric or magnetic altering properties. The combined flow is deposited in a cavity, in a predetermined pattern, to build a non-solidified item. The non-solidified item is solidified into the bulk absorber.

9 Claims, 3 Drawing Sheets

U.S. PATENT DOCUMENTS 5,045,141 A 9/1991 Salensky et al.
5,134,421 A 7/1992 Boyd et al.
5,323,170 A 6/1994 Lang
5,352,315 A 10/1994 Carrier et al.
5,356,958 A 10/1994 Matthews
5,364,705 A 11/1994 Callahan
5,403,422 A 4/1995 Kawai et al.
5,470,607 A 11/1995 Odashima et al.
5,494,180 A 2/1996 Callahan
5,532,295 A 7/1996 Harrison et al.
5,624,728 A 4/1997 Hoopingarner et al.
5,643,512 A 7/1997 Daws et al. .................. 264/43
5,652,019 A 7/1997 Moran
5,662,293 A 9/1997 Hower et al.
5,665,787 A 9/1997 Nowak et al.
5,667,866 A 9/1997 Reese, Jr.
5,676,785 A 10/1997 Samonides
5,691,390 A 11/1997 Harrison et al.
5,699,733 A 12/1997 Chang et al.
5,741,574 A 4/1998 Boyce et al.
5,776,579 A 7/1998 Jessup et al.
5,833,795 A 11/1998 Smith et al.
5,837,739 A 11/1998 Nowak et al. ................ 521/54
5,844,518 A 12/1998 Berg et al.
5,890,429 A 4/1999 Alam et al.
5,935,680 A 8/1999 Childress Fig. 1
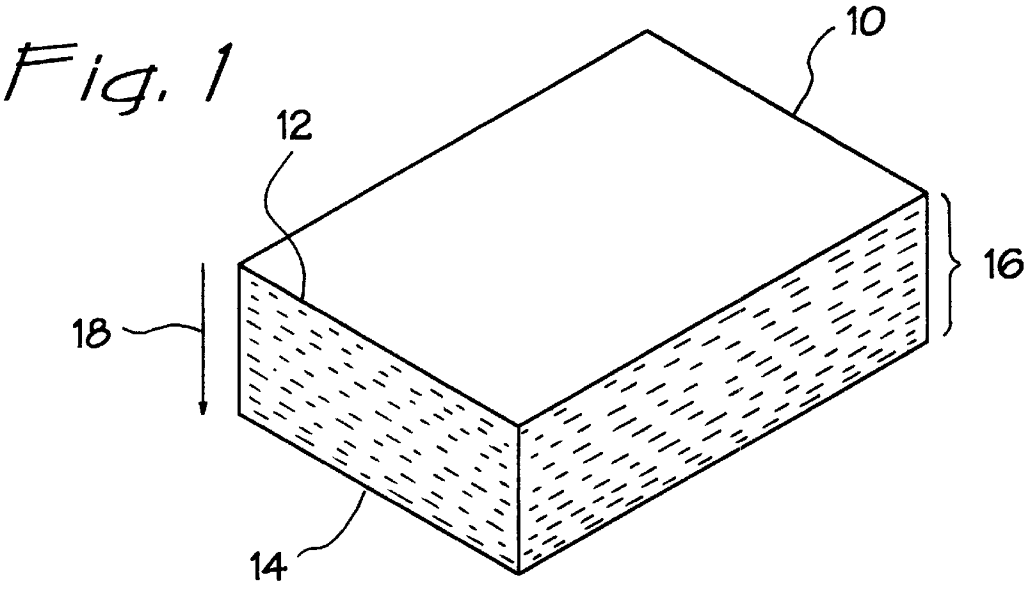
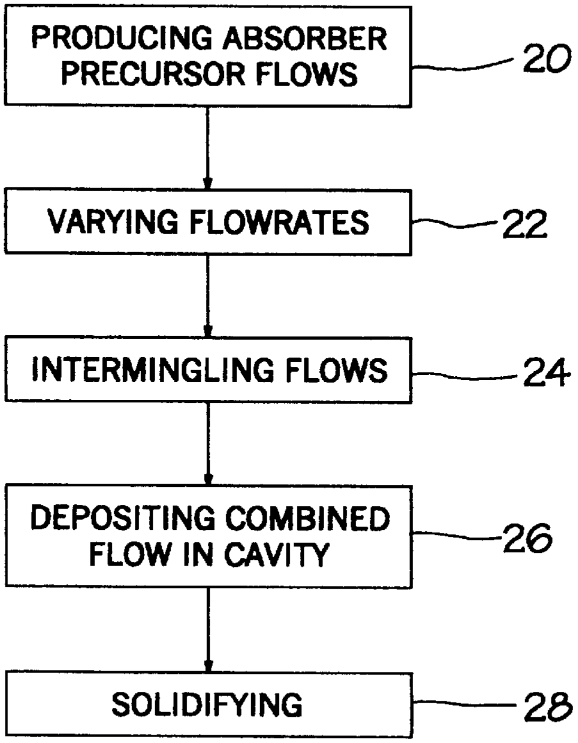
Fig. 2

BULK ABSORBER AND PROCESS FOR MANUFACTURING SAME

This application is a continuation of Ser. No 09/116,056, filed Jul. 15, 1998, now abandoned.

BACKGROUND OF THE INVENTION

1. Field of the Invention

The present invention relates to bulk absorbers having altered dielectric or magnetic properties, and more specifically, to bulk absorbers with predetermined concentration gradients.

2. Description of the Prior Art

Bulk absorbers are commonly used for absorbing radiation. A bulk absorber has varying particle concentrations throughout the absorber, which alter the dielectric or magnetic properties of the absorber. The particle concentrations can be designed to absorb target waves, depending on the application.

The prior art discloses absorbers have varying concentrations of dielectric or magnetic altering particles on a surface. These other absorbers include R-cards, R-film, and R-foam, as disclosed in U.S. Pat. Nos. 5,494,180 and 5,374,705, both of which are entitled "Hybrid Resistance Cards and Methods of Manufacturing Same," and co-pending U.S. patent applications entitled "Screen Ink Printed Film Carrier and Methods of Making and Using Same from Electrical Field Modulation" filed Dec. 10, 1997, and "R-foam and Method of Manufacturing Same" filed Mar. 25, 1998, all of which are expressly incorporated herein in their entireties.

The prior art also discloses fabricating bulk absorbers with a discontinuous concentration gradient of particles with dielectric or magnetic altering properties. The prior art bulk absorber is fabricated by laminating billets together. Each billet has a continuous concentration of dielectric or magnetic altering particles, resulting in a uniform dielectric or magnetic altering property gradient. The billets are laminated together with a bond layer in between each adjacent billet. As each billet is of a different concentration, the prior art bulk absorber has a step-wise concentration gradient of particles, and, as a result, a discontinuous dielectric or magnetic altering property gradient.

There are numerous disadvantages to the prior art bulk absorber with a discontinuous dielectric or magnetic altering property gradient. The discontinuities in the absorber, due to the step-wise changes in the dielectric or magnetic altering property gradient, cause reflection of the waves that are meant to be absorbed. Additionally, the bond layer in between the adjacent billets also causes reflection of the waves.

Therefore, what is needed is a bulk absorber fabricated such that wave reflection due to discontinuous dielectric or magnetic property gradients or bond layers is reduced or eliminated.

SUMMARY OF THE INVENTION

Accordingly, it is an objective of this invention to provide a bulk absorber having a continuous dielectric or magnetic altering property gradient and no bond layers, which results in reduced wave reflection.

In order to achieve the above and other objectives of the invention, a bulk absorber is provided with a body comprising a modified portion and particles dispersed throughout the modified portion in a substantially continuous concentration gradient. The particles have dielectric or magnetic altering properties. The particles may be carbon fibers, coated hollow microspheres, carbon black, carbon whiskers, or a combination thereof. The body may comprise foam materials or ceramic materials. The foam material may be syntactic or blown foam, and may be thermoplastic or thermoset.

More particularly, there is provided a bulk absorber radiation, which comprises a three-dimensional body comprised of a syntactic foam material and a plurality of magnetic or dielectric property-altering particles dispersed in a substantially continuous concentration of the three-dimensional body. The gradient extends along at least one dimension of the three-dimensional body (in one preferred embodiment, the body is a rectangular solid and the particle gradient extends along its depth, but can also extend along either or both of its height and its width), so that along the at least one dimension, the concentration of particles changes at a substantially continuous rate. The substantially continuous concentration gradient of property-altering particles results in a proportionally continuous rate of change of the altered property along the at least one dimension of the body.

A particularly important advantage of the present invention is that the inventive process for making the three-dimensional body enables its fabrication as a unified whole, meaning that, unlike the prior art, it need not be formed as a laminate comprising a plurality of billets, laminated together with bonding layers, wherein each billet has a distinctly different particle concentration, so that the process of laminating them together results in a stepwise change in particle concentration rather than the inventive continuous concentration gradient. In other words, the present invention resolves prior art problems concerning a predictable process for fabricating a bulk absorber having a continuous concentration gradient of property-altering particles along one or more dimensions of the bulk absorber body, so that it is no longer necessary to create a plurality of billets, each having a different uniform concentration of particles, and then laminating them together to create a stepwise particle concentration gradient. The inventive process and product is much better, and much less labor-intensive to make than the prior art approach.

In another aspect of the invention, there is provided a precursor for use in manufacturing a bulk absorber having altered dielectric or magnetic properties, comprising a syntactic foam comprised of an uncured resin. The precursor further comprises dielectric or magnetic property altering particles distributed in The resin in a substantially continuous concentration gradient therein. The gradient extends along at least one direction within the resin, so that along the at least one direction, the concentration of the particles changes at a substantially continuous rate, for providing a substantially continuous resistive taper in a bulk absorber to be molded using the precursor.

In another aspect of the invention a manufacturing system for fabricating the bulk absorber comprises delivery devices, control means, delivery means, positioning means, and forming means. The first and second bulk solids delivery devices produce first and second flows of absorber precursors through flow exits. The bulk solids delivery devices may be vibrational feeders. The control means varies the ratio of the flow rates of the first and second flows of absorber precursors. The control means may be any suitable device or control system for controlling the flow rates of the absorber precursors. The delivery means receives the first and second flows of absorber precursors from the flow exits and intermingles the flows to form a combined flow. The delivery means may comprise a generally horizontal conveyor belt having a discharge point. The positioning means deposits the combined flow in a predetermined pattern in a cavity to build a non-solidified item. The positioning means may comprise a translation means and/or a rotation means for changing the location of the cavity in a horizontal direction relative to the conveyor belt discharge point. The forming means is for solidifying the non-solidified item into the bulk absorber. In an aspect of the invention, the solidifying means sinters the non-solidified item in a sintering oven.

In another aspect of the invention, the process for manufacturing the bulk absorber has a first step of producing first and second flows of absorber precursors, wherein said first flow contains particles with dielectric or magnetic altering properties. Another step involves varying a ratio of flow rates of said first and second flows of absorber precursors. An additional step comprises intermingling the first and second flows of absorber precursors to form a combined flow. The manufacturing process also involves the step of depositing the combined flow in a predetermined pattern in a cavity to build a non-solidified item with a predetermined concentration gradient of particles with dielectric or magnetic altering properties. After the depositing step, the non-solidified bulk item is solidified into the bulk absorber.

In an aspect of the invention, the first and second flows of absorber precursors may be produced from vibrational feeders. The first and second flows are then intermingled by directing the flows to a generally horizontal conveyor belt such that the flows of particles overlap and discharged from a discharge point in a combined flow. The combined flow falls vertically into the cavity, with the cavity being positioned under the discharge point to adjust the cavity position relative to the discharge point such that the combined flow may falls in a predetermined pattern into the cavity. In another aspect of the invention, a bulk absorber is produced by the above-described process.

In an aspect of the invention, the magnetic or dielectric altering materials may be carbon fibers, coated hollow microspheres, carbon black, carbon whiskers, or a combination thereof. Further, the first and second flows of absorber precursors may comprise foam or ceramic material. The foam material may be syntactic or blown or may be thermoplastic or thermosetting.

BRIEF DESCRIPTION OF THE DRAWINGS

FIG. 1 is an isometric view of a bulk absorber with a continuous concentration gradient of particles with dielectric or magnetic altering properties according to an embodiment of the invention;

FIG. 2 shows a flow chart of the process of manufacturing the bulk absorber;

DETAILED DESCRIPTION OF THE PREFERRED EMBODIMENTS

Figure 3:
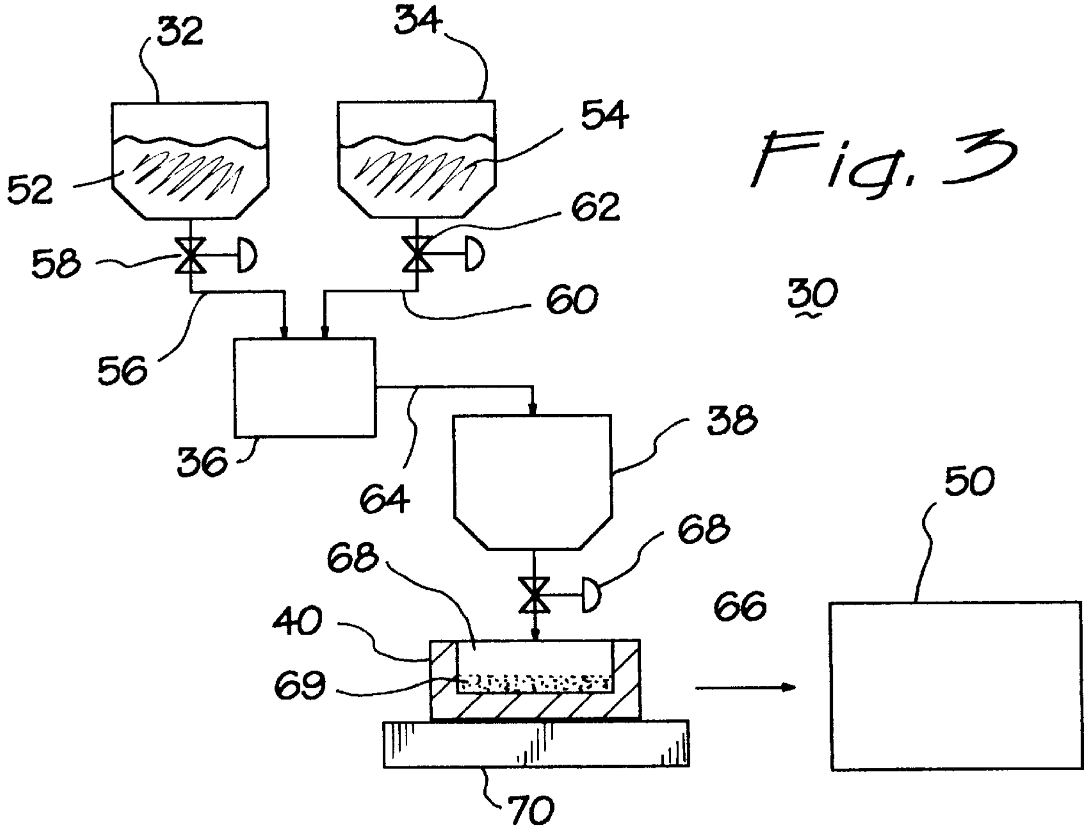
FIGS. 3 and 4 show schematic views of systems to make the bulk absorber.

Now referring to the figures, wherein like reference numbers refer to like elements throughout the figures, and specifically referring to FIG. 1, a bulk absorber 10 comprises a top surface 12 and a bottom surface 14. The depth 16 of the bulk absorber 10, which extends from the top surface 12 to the bottom surface 14, has a continuous concentration gradient of particles 18. The particles have dielectric or magnetic altering properties. As a result, the bulk absorber 10 has a continuous dielectric or magnetic altering property gradient. In other embodiments of the invention, only a modified portion of the bulk absorber comprises the particles having dielectric or magnetic altering properties.

The bulk absorber 10 may be comprised of various materials. In preferred embodiments of the invention, the majority of the bulk absorber 10 may be comprised of foam material or ceramic material. The foam material may be syntactic or blown, and also may be thermoplastic or thermosetting. In one highly preferred embodiment of the invention, the foam is thermoplastic syntactic foam, an example of which is disclosed in U.S. Pat. No. 5,532,295 entitled "Thermoplastic Syntactic Foams and Their Preparation," which is incorporated herein by reference in its entirety. Other embodiments of the invention may use other suitable materials besides foam and ceramic.

The particles with dielectric or magnetic altering properties, which are dispersed in a continuous concentration gradient 18 throughout the bulk absorber 10, include carbon fibers, coated hollow microspheres, carbon black, carbon whiskers, or a combination thereof. In one preferred embodiment of the invention, the carbon fibers are derived from polyacrylonitile precursor fiber. In one highly preferred embodiment, the carbon fiber diameter is approximately 0.3 mils and carbon fiber length is approximately 0.03 to 0.06 inches in length. The carbon fibers have a resistivity of between 0.01 ohms per centimeter in length to 0.30 ohms per centimeter in length. The carbon fibers may be provided by Textron, 2 Industrial Avenue, Lowell, Mass. 01851. The coated hollow glass microspheres include high strength, low density microspheres with a 2.5 grams per cubic centimeter density, high silicon microspheres with a 0.20 grams per cubic centimeter density, or high silicon microspheres with a 95 micrometers diameter and a density of 0.20 grams per cubic centimeter. Further, the microspheres may have no surface treatment, be treated with N-phenylamino propyltrimethoxy silane with the coating comprising 0.4 to 0.6 percent weight of the microspheres; or $\gamma$-glycidoxypropyltrimethoxy silane, at 0.3 to 0.5 percent weight. The hollow glass microspheres may be provided by Emerson & Cuming, 59 Walpole Street, Canton, Mass. 02021.

In one preferred embodiment of the invention, the bulk absorber 10 comprises thermoplastic syntactic foam material and the particles have dielectric altering properties. In one highly preferred embodiment of the invention, the particles are carbon fibers.

Other embodiments of the invention may have different shapes and concentration gradients for the bulk absorber 10. The shape of the bulk absorber 10 shown in FIG. 1 is a rectangular solid. Other embodiments of the invention may have other shapes. In one embodiment of the invention, the bulk absorber is pyramidal. Embodiments of the invention may have the continuous concentration gradient 18 going in one or more other directions besides the depth 16 as shown in FIG. 1.

Now referring to FIG. 2, the process for manufacturing the bulk absorber 10 starts with a step 20 of producing first and second absorber precursor flows. Other embodiments of the invention may have more than two absorber precursor flows. In preferred embodiments of the invention, the precursor flows comprise either foam or ceramic precursors, with at least one of the flows containing particles with dielectric or magnetic altering properties. The composition of the particles in various embodiments of the invention was previously described.

In one preferred embodiment of the invention, the absorber precursors are milled foam or ceramic particles that solidify into the bulk absorber 10 when sintered. In one highly preferred embodiment, the absorber precursor is ground resin milled from a low-viscosity polyetheramide resin. The low-viscosity resin has a melt flow of greater than 16.0 to 20.0 G/10 in accordance with ASTM D 1238, an Izod impact notch of greater the 0.6 foot-pounds per inch and an Izod impact reverse notch of greater than 20.0 foot-pounds per inch in accordance with ASTM D 3029; and a yellowness index of less than 125 in accordance with ASTM D 1925. In one embodiment of the invention, the ground resin has a particle diameter of less than 106 micron with a maximum of 3% retained on a 140 mesh U.S. Standard sieve. In another embodiment of the invention, the ground resin has a particle diameter of less than 46 microns, with a maximum of 2% retained on a 325 mesh U.S. Standard sieve, with a laser test having 100% of the grounds being finer than 54 microns and 50% of the grounds being between 15 and 30 microns.

Next, in a step 22, the ratio of the flow rates is varied for the first and second flows of absorber precursors. Next, in a step 24, the two absorber precursor flows are intermingled to produce a combined absorber precursor flow. The combination of steps 22 and 24 produces a combined flow which has a controlled, varying concentration of particles with dielectric or magnetic altering properties over time. Next, in step 26, the combined flow is deposited in a cavity along a certain pattern. This pattern enables the flow to fill the cavity, while also resulting in particles having dielectric or magnetic altering properties to be distributed in a predetermined gradient throughout the cavity, whether it is a continuous concentration gradient, a uniform distribution, or discrete layers of concentrations of particles of altering properties. In step 28, the collection of particles in the cavity is solidified. In one preferred embodiment of the invention, the solidification process involves sintering the ceramic or foam precursors.

Now referring to FIG. 3, a manufacturing system 30 for fabricating a bulk absorber following the process shown in FIG. 2 comprises a first bulk solids delivery device 32, a second bulk solids delivery device 34, a mixer 36, a feeder 38, a mold 40, and a sintering oven 50. The first bulk solids delivery device 32 holds a first batch of absorber precursors 52 therein. The second bulk solids delivery device 34 holds a second batch of absorber precursors 54 therein. In one preferred embodiment of the invention, the second batch 54 contains particles with magnetic or dielectric altering properties. In this preferred embodiment, the first batch 52 may be considered "unloaded" because it does not contain particles with magnetic or dielectric altering properties, while the second batch 54 may be considered loaded because it contains the property altering particles. Other embodiments of the invention may have the loaded precursors in the first batch and the unloaded precursors in the second batch.

Corresponding to the producing absorber precursor flows step 20, a first flow of absorber precursor 56 comes out of the device 32 through a first control means 58 and a second flow of absorber precursor 60 comes out of the device 34 through a second control means 62. The first and second control means 58 and 62 vary the ratio of flow rates of the first and second flow of absorber precursor 56 and 60, which corresponds to the varying flowrate step 22.

As described in connection with the intermingling flows step 24, the first and second flows 56 and 60 enter into the mixer 36 are blended. A prefeeder combined flow 64 exits the mixer 36 and enters the feeder 38. A post-feeder combined flow 66 exits the feeder 38 through a third control means 68, with the control means 68 controlling the rate of flow 66.

Corresponding to the depositing combined flow in cavity step 26, the post-feeder combined flow 66 is deposited in a cavity 68 in a predetermined pattern to build a non-solidified item 69. Via the positioning table 70, the cavity 68 is positioned below the post-feeder combined flow 66. The position table 70 also moves the mold during the step 26 such that the cavity 68 fills in a predetermined pattern. By controlling the ratios of the absorber precursor flows 56 and 60 and the filling the cavity 68 in a pattern, the non-solidified item 69 has a predetermined concentration gradient of the particles with dielectric or magnetic altering properties. In a preferred embodiment of the invention, the concentration gradient is continuous so as to eliminate wave reflection due to step-wise concentration gradients. The manufacturing system 100 may be used to manufacture bulk absorbers with discontinuous concentration gradients or a uniform particle distribution.

Corresponding to the solidifying step 28, the filled cavity 68 with the non-solidified item 69 is transferred into a sintering oven 50, where the item 69 is solidified in a bulk absorber.

Figure 4:
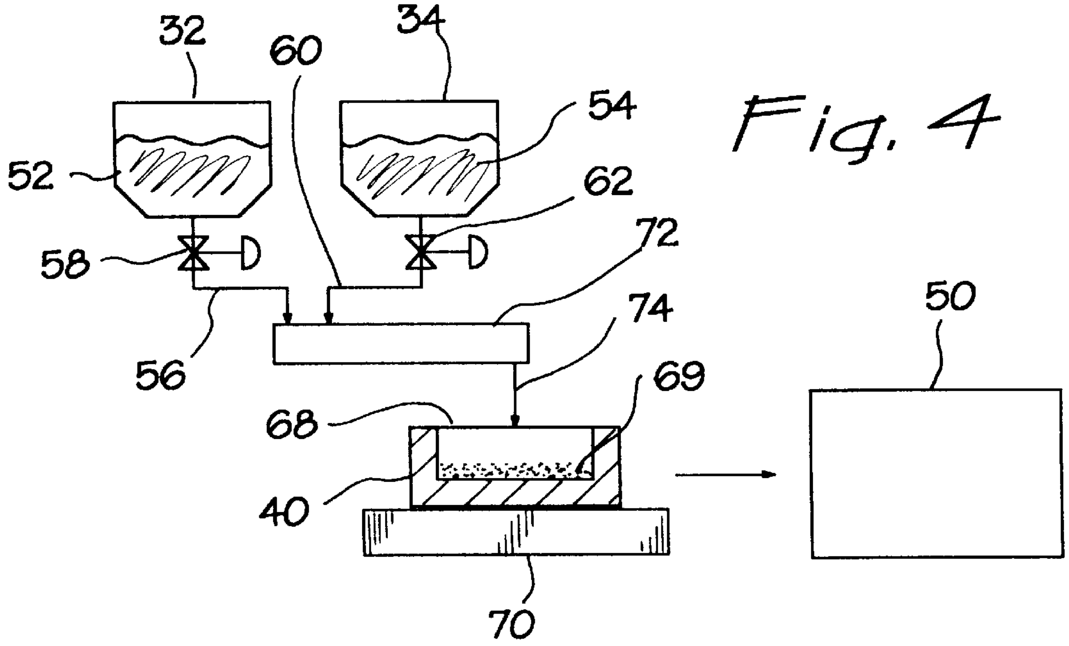

Now referring to FIG. 4, a manufacturing system 90 for fabricating a bulk absorber according to one embodiment of the invention is similar to the manufacturing system 30 shown in FIG. 3, but for an in-line mixer 72 replacing the mixer 36 and the feeder 38. The first and second flows of absorber precursors 56 and 60 are delivered to the in-line mixer 72 to mix the flows into a post-mixer combined flow 74. Further, the post-mixer combined flow 74 is not controlled directly, unlike the analogous post feeder combined flow 66 of the system 30 which is controlled by the third control means 68. Instead, the combined flow 74 is controlled primarily by controlling the flows 56 and 60 with the control means 58 and 62. The in-line mixer 72 may have some flow control capabilities, such as variable retention times of material, in some embodiments of the invention. The post-mixer combined flow 74 flows into the cavity 68 in a pattern in a similar fashion as described in reference to FIG. 3. Further, once the cavity 68 is filled, the non-solidified item 69 is sintered in the sintering oven 50.

Figure 5:
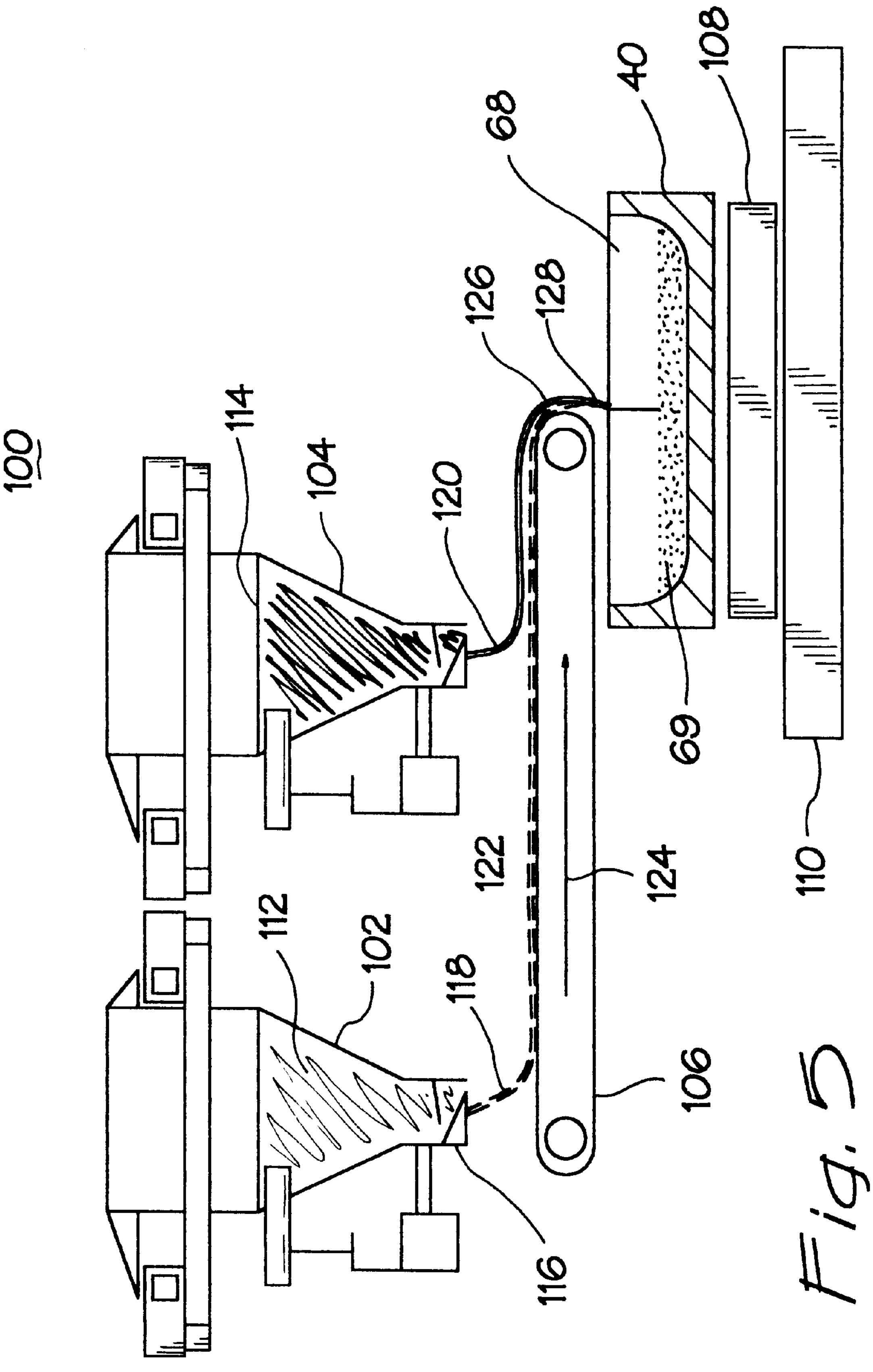
FIG. 5 shows a schematic view of a system, comprising vibrational feeders and a conveyor belt, used to make the bulk absorber.

Now referring to FIG. 5, according to one preferred embodiment of the invention, a manufacturing system 100 has a first vibrational feeder 102, a second vibrational feeder 104, a conveyor belt 106, a mold 40, a rotation table 108, and a translation table 110. The manufacturing system 100 is shown with two vibrational feeders 102 and 104, but other embodiments of the invention may have more vibrational feeders. Other embodiments of the invention may use other suitable equipment for creating the flows of absorber precursors, including gyrating hoppers, whirlpool-type hoppers, screw feeders, table feeders, sloping striker plate feeders, star feeders, vibratory feeders.

In one preferred embodiment of the invention, the first vibrational feeder 102 is filled with unloaded absorber precursors 112, and the second vibrational feeder 104 is filled with loaded absorber precursors 114. The first vibrational feeder 102 has a flow control means 116 which regulates a flow of unloaded absorber precursor 118 coming therefrom. In a preferred embodiment of the invention, the flow control means 116 comprises a relatively wide exit (not shown) from the feeder 102, with removable and positionable slats (not shown) partially blocking the exit, to control the flow. Other embodiments of the invention may use other flow control means, including masks, solenoids, or other control devices. A loaded flow of absorber precursors 120 exits the second vibrational feeder 104 through the flow control means 122. The flow control means 122 may operate similarly to the flow control means 116. The flow control means 116 and 122 varies the ratio of flow rates 118 and 120.

The conveyor belt 106 operates as the in-line mixer 72 of the manufacturing system 90. The unloaded flow 118 descends upon a conveyor belt 106. The loaded flow 120 descends on the conveyor belt 106 and overlaps the unloaded flow 118. In one embodiment of the invention, the thickness of the unloaded flow of particles 118 and the loaded flow of particles 120 on the conveyor belt 106 is approximately 0.01 to 0.1 inches. The flow control means 116 and the flow control means 122 are arranged over the conveyor belt 106 such that they define a line that is substantially parallel to a conveying direction 124 of the conveyor belt 106, thereby enabling the flows 118 and 120 to overlap. Due to the vibration of the conveyor belt 106, the overlapping flow of particles 118 and 120 intermingle on the belt. The intermingled flows 118 and 120 discharge off the belt 106 at a discharge point 126 as a combined flow 128. The combined flow 128 vertically descends into cavity 68 of mold 40.

The combined flow 128 is shown depositing into the cavity 68 in a predetermined pattern. The mold 40 is shown positioned on a rotation table 108, which is positioned on a translation table 110. The rotation table 108 rotates the mold either clockwise, or counterclockwise, in a horizontal plane. The translation table 110 moves the mold linearly in either one or two directions. An advantage of rotating the mold 40 during the depositing of the combined flow particles 128 into the cavity 68 is to minimize orientation of the particles with dielectric or magnetic altering properties. An advantage of the translation table 110 is to move the tool relative to the conveyor belt discharge point 126, which accommodates molds of increased dimensions. Embodiments of the invention may use any combination of devices to provide any combination of rotational and/or linear movements. Other embodiments of the invention may use other means for positioning the mold 40 under the combined flow of particles 128, including manually moving the mold around.

In an embodiment of the invention, the mold 40 rests on a scale to measure the amount of material in the mold. The weight of the material in the mold 40 is used to make adjustments to the flow rate of the flow of absorber precursors 118 and 120.

The present invention may be embodied in other specific forms without departing from its spirit or essential attributes. For example, one embodiment of the invention may have a flow control means for controlling the post mixer combined flow 74 as shown in FIG. 4. Accordingly, reference should be made to 0the appended claims, rather than to the foregoing specification, as indicating the scope of the invention.

What is claimed is:

1. A bulk absorber for absorbing radiation, comprising:

a three-dimensional body comprised of a syntactic foam material; and a plurality of magnetic or dielectric property-altering particles dispersed in a substantially continuous concentration gradient within said body, said gradient extending along at least one dimension of the body, so that along said at least one dimension, the concentration of said particles changes at a substantially continuous rate, said substantially continuous concentration gradient of property-altering particles resulting in a proportionally continuous rate of change of the altered property along said at least one dimension of said body.

2. The bulk absorber as recited in claim 1, wherein said particles comprise carbon fibers, coated microspheres, carbon black, carbon, whiskers, or a combination thereof.

3. The bulk absorber as recited in claim 1, wherein said substantially continuous concentration gradient of property-altering particles extends along at least two dimensions of said three-dimensional body.

4. The bulk absorber as recited in claim 1, wherein said body is not a laminated structure, and therefore does not include any bond layers.

5. The bulk absorber as recited in claim 1, wherein said property-altering particles comprise carbon fibers having a diameter of approximately 0.3 mils and a length of between 0.03 and 0.06 inches.

6. The bulk absorber as recited in claim 5, wherein said carbon fibers have a resistivity of between 0.01 and 0.30 ohms per centimeter in length.

7. The bulk absorber as recited in claim 1, wherein said body includes a modified portion which comprises less than the entirety of said body, said particles being dispersed in said substantially continuous concentration gradient only in said modified portion.

8. A precursor for use in manufacturing a bulk absorber having altered dielectric or magnetic properties, comprising:

syntactic foam comprised of an uncured resin; and dielectric or magnetic property altering particles distributed in the resin in a substantially continuous concentration gradient therein, said gradient extending along at least one direction within the resin, so that along said at least one direction, the concentration of said particles changes at a substantially continuous rate, for providing a substantially continuous resistive taper in a bulk absorber to be molded using said precursor.

9. The precursor as recited in claim 8, wherein said precursor is disposed within a mold cavity along a certain predetermined pattern.

* * * * *